(12) United States Patent
Griggs (10) Patent No.: US 7,649,836 B2
(45) Date of Patent: Jan. 19, 2010

(54) LINK STATE MACHINE FOR THE ADVANCED SWITCHING (AS) ARCHITECTURE

(75) Inventor: Aric Griggs, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 964 days.

(21) Appl. No.: 10/933,688

(22) Filed: Sep. 2, 2004

(65) Prior Publication Data

US 2006/0056400 A1 Mar. 16, 2006

(51) Int. Cl.
*H04L 12/26* (2006.01)
(52) U.S. Cl. ................................ 370/223; 713/320
(58) Field of Classification Search ......... 370/389–409, 370/216–228; 713/300–323
See application file for complete search history.

(56) References Cited

U.S. PATENT DOCUMENTS

| 7,188,263 | B1* | 3/2007 | Rubinstein et al. ........... 713/300 |
| 7,539,883 | B2* | 5/2009 | Kojou et al. ................. 713/320 |
| 7,584,375 | B2* | 9/2009 | Gutman et al. .............. 713/323 |
| 2002/0163686 | A1* | 11/2002 | Bischoff et al. ............. 359/110 |
| 2003/0161348 | A1* | 8/2003 | Mills et al. .................. 370/509 |
| 2005/0086549 | A1* | 4/2005 | Solomon et al. ............ 713/320 |
| 2005/0097378 | A1* | 5/2005 | Hwang ....................... 713/320 |
| 2005/0220054 | A1* | 10/2005 | Meier et al. ................. 370/331 |
| 2006/0077909 | A1* | 4/2006 | Saleh et al. ................. 370/254 |

* cited by examiner

*Primary Examiner*—Thai D Hoang
(74) *Attorney, Agent, or Firm*—Fish & Richardson P.C.

(57) ABSTRACT

A link state machine for the Advanced Switching (AS) Architecture includes added transition sub-states. Transition events typically handled in AS link states are handled in the transition sub-states. Separating the transition events and flow from the link states into smaller transition sub-states may make the AS link machine easier to manage and facilitate debugging efforts.

18 Claims, 5 Drawing Sheets

LINK STATE MACHINE FOR THE ADVANCED SWITCHING (AS) ARCHITECTURE

BACKGROUND

PCI (Peripheral Component Interconnect) Express is a serialized I/O interconnect standard developed to meet the increasing bandwidth needs of the next generation of computer systems. PCI Express was designed to be fully compatible with the widely used PCI local bus standard. PCI is beginning to hit the limits of its capabilities, and while extensions to the PCI standard have been developed to support higher bandwidths and faster clock speeds, these extensions may be insufficient to meet the rapidly increasing bandwidth demands of PCs in the near future. With its high-speed and scalable serial architecture, PCI Express may be an attractive option for use with or as a possible replacement for PCI in computer systems. The PCI Express architecture is described in the PCI Express Base Architecture Specification, Revision 1.0a (Initial release Apr. 15, 2003), which is available through the PCI-SIG (PCI-Special Interest Group) (http://www.pcisig.com)].

Advanced Switching (AS) is an extension to the PCI Express architecture. AS utilizes a packet-based transaction layer protocol that operates over the PCI Express physical and data link layers. The AS architecture provides a number of features common to multi-host, peer-to-peer communication devices such as blade servers, clusters, storage arrays, telecom routers, and switches. These features include support for flexible topologies, packet routing, congestion management (e.g., credit-based flow control), fabric redundancy, and fail-over mechanisms. The AS architecture is described in the Advanced Switching Core Architecture Specification, Revision 1.0 (December 2003), which is available through the ASI-SIG (Advanced Switching Interconnect-SIG) (http//:www.asi-sig.org).

Summary

A first link state is transitioned to a first transition sub-state in response to receiving a command to transition to a second link state. A request for transition is received to the second link state from a link partner. An acknowledgement to the link partner is sent, and the transition to the second link state is made.

A second transition sub-state can be transitioned to in response to receiving the request from the link partner.

An acknowledgement from the second transition sub-state can be sent.

Implementation can include one or more of the following.

The transitioning from the first and second link states can comprise transitioning from first and second Advanced Switching (AS) link states.

The receiving the command can comprise receiving a software control command.

Receiving the request from the link partner can comprise receiving the request in the first transition sub-state. The sending of the acknowledgment can comprise sending the acknowledgement in the second link state.

The transitioning from the first link state can comprise transitioning from an initialization link state. The transitioning to the second link state can comprise transitioning to a protected link state. The protected link state can comprise an intermediate link state between the initialization link state and an active link state.

The transitioning from the first link state can comprise transitioning from a protected link state. The transitioning to the second link state can comprise transitioning to an active link state.

The transitioning from the first link state can comprise transitioning from an active link state. The transitioning to the second link state can comprise transitioning to a protected link state.

In an aspect, a computer-implemented method comprises steps as outlined above.

In another aspect, an apparatus can be configured to perform the steps outlined above.

In yet another aspect, article comprising a machine-readable medium including machine-executable instructions, the instructions causing the machine to perform the steps as outlined above.

DETAILED DESCRIPTION

Figure 1:
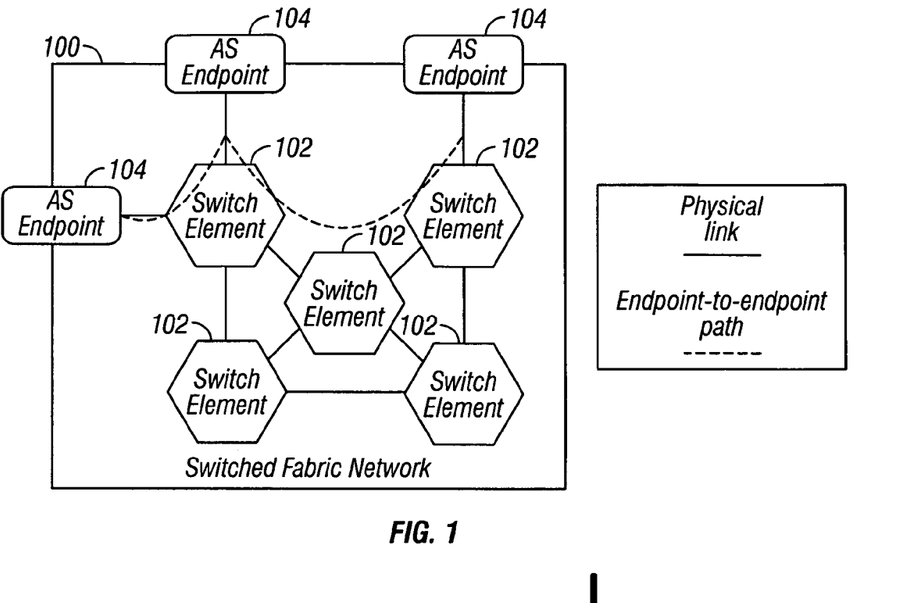
FIG. 1 is a block diagram of a switched fabric network according to an embodiment.

FIG. 1 shows a switched fabric network 100 according to an embodiment. The network may include switch elements 102 and end nodes 104. The switch elements 102 constitute internal nodes of the network 100 and provide interconnects with other switch elements 102 and end nodes 104. The end nodes 102 reside on the edge of the switch fabric and represent data ingress and egress points for the switch fabric. The end nodes may encapsulate and/or translate packets entering and exiting the switch fabric and may be viewed as "bridges" between the switch fabric and other interfaces.

Figure 2:
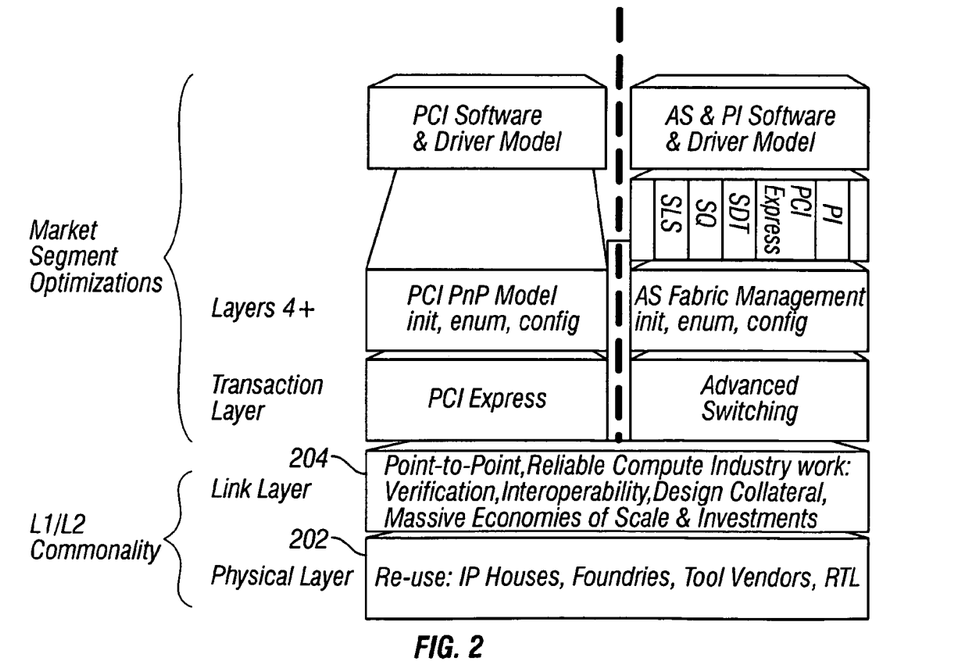
FIG. 2 shows the protocol stacks for the PCI Express and Advanced Switching (AS) architectures.

The network 100 may have an Advanced Switching (AS) architecture. AS utilizes a packet-based transaction layer protocol that operates over the PCI Express physical and data 204 link layers, as shown in FIG. 2.

Figure 3:
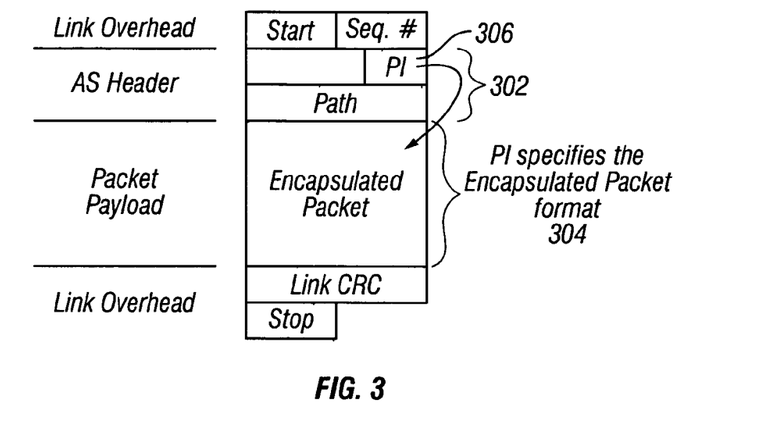
FIG. 3 illustrates an AS transaction layer packet (TLP) format.

AS uses a path-defined routing methodology in which the source of a packet provides all information required by a switch (or switches) to route the packet to the desired destination. FIG. 3 shows an AS transaction layer packet (TLP) format 300. The packet includes a route header 302 and an encapsulated packet payload 304. The AS route header 302 contains the information necessary to route the packet through an AS fabric (i.e., "the path"), and a field that specifies the Protocol Interface (PI) of the encapsulated packet. AS switches use only the information contained in the route header 302 to route packets and do not care about the contents of the encapsulated packet 304.

Figure 4:
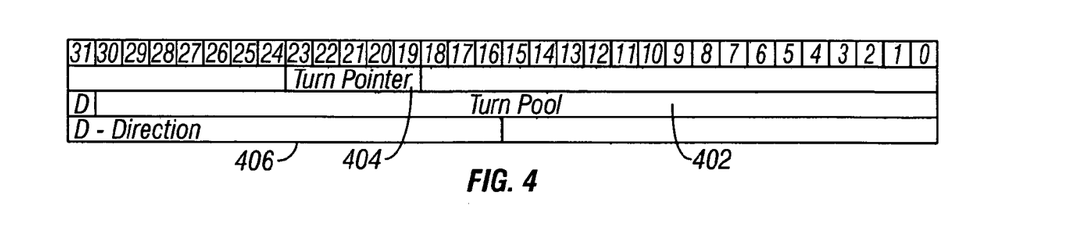
FIG. 4 illustrates an AS route header format.

A path may be defined by the turn pool 402, turn pointer 404, and direction flag 406 in the route header, as shown in FIG. 4. A packet's turn pointer indicates the position of the switch's "turn value" within the turn pool. When a packet is received, the switch may extract the packet's turn value using the turn pointer, the direction flag, and the switch's turn value bit width. The extracted turn value for the switch may then used to calculate the egress port.

The PI field 306 in the AS route header 302 (FIG. 3) specifies the format of the encapsulated packet. The PI field is inserted by the end node that originates the AS packet and is used by the end node that terminates the packet to correctly interpret the packet contents. The separation of routing information from the remainder of the packet enables an AS fabric to tunnel packets of any protocol.

PIs represent fabric management and application-level interfaces to the switched fabric network 100. Table 1 provides a list of PIs currently supported by the AS Specification.

TABLE 1

AS protocol encapsulation interfaces

| PI number | Protocol Encapsulation Identity (PEI) |
|---|---|
| 0 | Fabric Discovery |
| 1 | Multicasting |
| 2 | Congestion Management |
| 3 | Segmentation and Reassembly |
| 4 | Node Configuration Management |
| 5 | Fabric Event Notification |
| 6 | Reserved |
| 7 | Reserved |
| 8 | PCI-Express |
| 9-223 | ASI-SIG defined PEIs |
| 224-254 | Vendor-defined PEIs |
| 255 | Invalid |

PIs 0-7 are reserved for various fabric management tasks, and PIs 8-254 are application-level interfaces. As shown in Table 1, PI8 is used to tunnel or encapsulate native PCI Express. Other PIs may be used to tunnel various other protocols, e.g., Ethernet, Fibre Channel, ATM (Asynchronous Transfer Mode), InfiniBand®, and SLS (Simple Load Store). An advantage of an AS switch fabric is that a mixture of protocols may be simultaneously tunneled through a single, universal switch fabric making it a powerful and desirable feature for next generation modular applications such as media gateways, broadband access routers, and blade servers.

The AS architecture supports the establishment of direct endpoint-to-endpoint logical paths known as Virtual Channels (VCs). This enables a single switched fabric network to service multiple, independent logical interconnects simultaneously, each VC interconnecting AS end nodes for control, management, and data. Each VC provides its own queue so that blocking in one VC does not cause blocking in another. Since each VC has independent packet ordering requirements, each VC may be scheduled without dependencies on the other VCs.

The AS architecture defines three VC types: Bypass Capable Unicast (BVC); Ordered-Only Unicast (OVC); and Multicast (MVC). BVCs have bypass capability, which may be necessary for deadlock free tunneling of protocols. OVCs are single queue unicast VCs, which may be suitable for message oriented "push" traffic. MVCs are single queue VCs for multicast "push" traffic.

The AS architecture provides a number of congestion management techniques, one of which is a credit-based flow control technique used to prevent packets from not being lost due to congestion. Link partners (e.g., an endpoint 104 and a switch element 102) in the network exchange flow control credit information to guarantee that the receiving end of a link has the capacity to accept packets. Flow control credits may be computed on a VC-basis by the receiving end of the link and communicated to the transmitting end of the link. Typically, packets may be transmitted only when there are enough credits available for a particular VC to carry the packet. Upon sending a packet, the transmitting end of the link may debit its available credit account by an amount of flow control credits that reflects the packet size. As the receiving end of the link processes (e.g., forwards to an endpoint 104) the received packet, space is made available on the corresponding VC and flow control credits are returned to the transmission end of the link. The transmission end of the link then adds the flow control credits to its credit account.

The AS architecture supports the implementation of an AS Configuration Space in each AS device in the network. The AS Configuration Space is a storage area that includes fields to specify device characteristics as well as fields used to control the AS device. The information is presented in the form of capability structures and other storage structures, such as tables and a set of registers. Table 2 provides a set of capability structures ("AS native capability structures") that are defined by the AS Specification.

TABLE 2

AS Native Capability Structures

| AS Native Capability Structure | End nodes | Switch Elements |
|---|---|---|
| Baseline Device | R | R |
| Spanning Tree | R | R |
| Spanning Tree Election | O | N/A |
| Switch Spanning Tree | N/A | R |
| Device PI | O | O |
| Scratchpad | R | R |
| Doorbell | O | O |
| Multicast Routing Table | N/A | O |
| Semaphore | R | R |
| AS Event | R | R |
| AS Event Spooling | O | N/A |
| AS Common Resource | O | N/A |
| Power Management | O | N/A |
| Virtual Channels | R w/OE | R w/OE |
| Configuration Space Permission | R | R |
| Endpoint Injection Rate Limit | O | N/A |
| Status Based Flow Control | O | O |
| Minimum Bandwidth Scheduler | N/A | O |
| Drop Packet | O | O |
| Statistics Counters | O | O |
| SAR | O | N/A |
| Integrated Devices | O | N/A |

Legend:
O = Optional normative
R = Required
R w/OE = Required with optional normative elements
N/A = Not applicable The information stored in the AS native capability structures may be accessed through PI-4 packets, which are used for device management.

In one implementation of a switched fabric network, the AS devices on the network may be restricted to read-only access of another AS device's AS native capability structures, with the exception of one or more AS end nodes which have been elected as fabric managers.

A fabric manager election process may be initiated by a variety of either hardware or software mechanisms to elect one or more fabric managers for the switched fabric network. A fabric manager is an AS endpoint that "owns" all of the AS devices, including itself, in the network. If multiple fabric managers, e.g., a primary fabric manager and a secondary fabric manager, are elected, then each fabric manager may own a subset of the AS devices in the network. Alternatively, the secondary fabric manager may declare ownership of the AS devices in the network upon a failure of the primary fabric manager, e.g., resulting from a fabric redundancy and fail-over-mechanism.

Once a fabric manager declares ownership, it has privileged access to it's AS devices' AS native capability structures. In other words, the fabric manager has read and write access to the AS native capability structures of all of the AS devices in the network, while the other AS devices are restricted to read-only access, unless granted write permission by the fabric manager.

According to the PCI Express Link Layer definition a link is either down (DL_Inactive=no transmission or reception of packets of any type), fully active (DL_Active), i.e., fully operational and capable of transmitting and receiving packets of any type or in the process of being initialized (DL_Init).

AS architecture adds to PCI Express' definition of this state machine by introducing a new data-link layer state, DL_Protected, which becomes an intermediate state between the DL_Init and DL_Active states. The PCI Express DL_Inactive, DL_Init, and DL_Active states are preserved. The new state may be needed to an intermediate degree of communication capability and serves to enhance an AS fabric's robustness and HA (High Availability) readiness.

Figure 5:
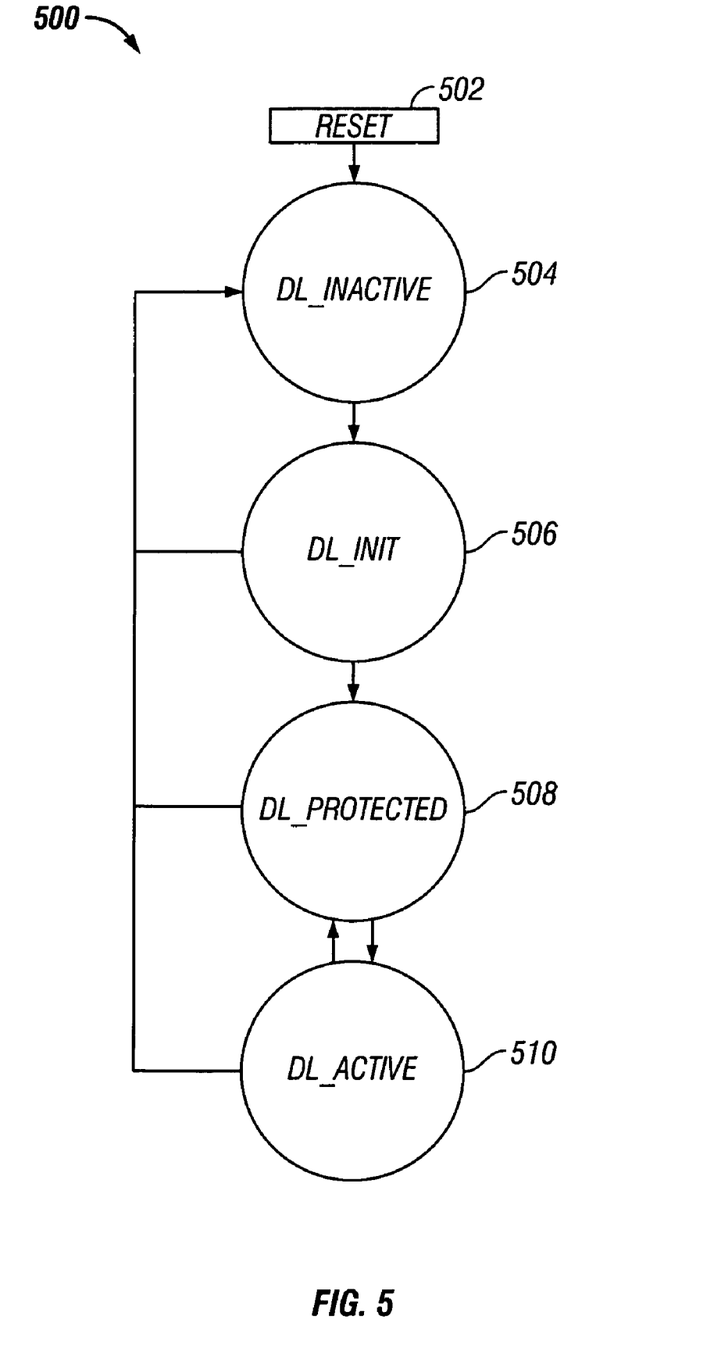
FIG. 5 illustrates an AS receive link state machine.

FIG. 5 shows an AS receive link state machine 500, which defines the transitions between link states. When the AS device exits reset 502, it enters the DL_Inactive state 504. In DL_Inactive, the device cannot achieve synchronization with its link partner, if any. However, devices in the DL_Inactive state may regularly attempt to synchronize with their potential link partner.

When the device has detected a link partner and is attempting initialization, the device enters the DL_Init state 506. DL_Init is a purely transitive state, and a link in the DL_Init state either successfully initializes and transitions to the DL_Protected state 508, or initialization fails and the link returns to the DL_Inactive state 506.

A link that successfully initializes automatically attempts to transition into the DL_Protected state 508. The DL_Protected state facilitates a fabric management mediated transition from the DL_Init state to the fully operational DL_Active state 510. While in the DL_Protected state, the link limits its reception to PI-0:0 (spanning tree) packets and PI-4 (device management) packets with a turn pointer value of 0. All packets received are acknowledged, even packets that are discarded.

In the DL_Active state 510, the device is configured and has the ability to send and receive packets over the fabric. All packet types are accepted and acknowledged. The fabric manager may perform a discovery process to identify endpoints and switches.

A device may transition from either DL_Active or DL_Protected to DL_Inactive when a link is taken down, either by hardware or software.

Link states may be communicated between link partners via DLLPs (Data Link Layer Packets), which are 6-byte packets that communicate link management specific information between the two devices sharing the link. Link state DLLPs have strict priority over all packets (TLPs and DLLPS) except packets that are in-flight. Link state acknowledgements must be sent as early as possible, i.e., as soon as the transmission of the packet currently occupying the link is completed.

If a device's receive state is to change, the device must communicate that state change via the link to its link partner. Link state transition is temporally imprecise from a system control perspective because a link that is commanded to enter any particular state does not necessarily do so immediately. Prior to completing link state transition to a non-DL_Inactive state, a device must see an acknowledgement of its intention to transition its link state. If a device is unable to elicit an acknowledgement from its link partner, the device transitions the link to the DL_Inactive state. Acknowledgements are elicited by repeated transmissions of a state change DLLP. A device wishing to transition the receive state of a link must send a maximum of eight state change notifications with an inter-notification delay of 10 microseconds.

Once an acknowledgement has been received, the notification process is terminated (any unsent notifications remain unsent). The target of notifications must return an acknowledgement for every notification received (the acknowledgement is just as likely to be lost as the notification). If all eight notifications are sent and if no acknowledgements have been received 10 microseconds after the transmission of the eighth notification, then the device transitions to the DL_Inactive state.

Figure 6:
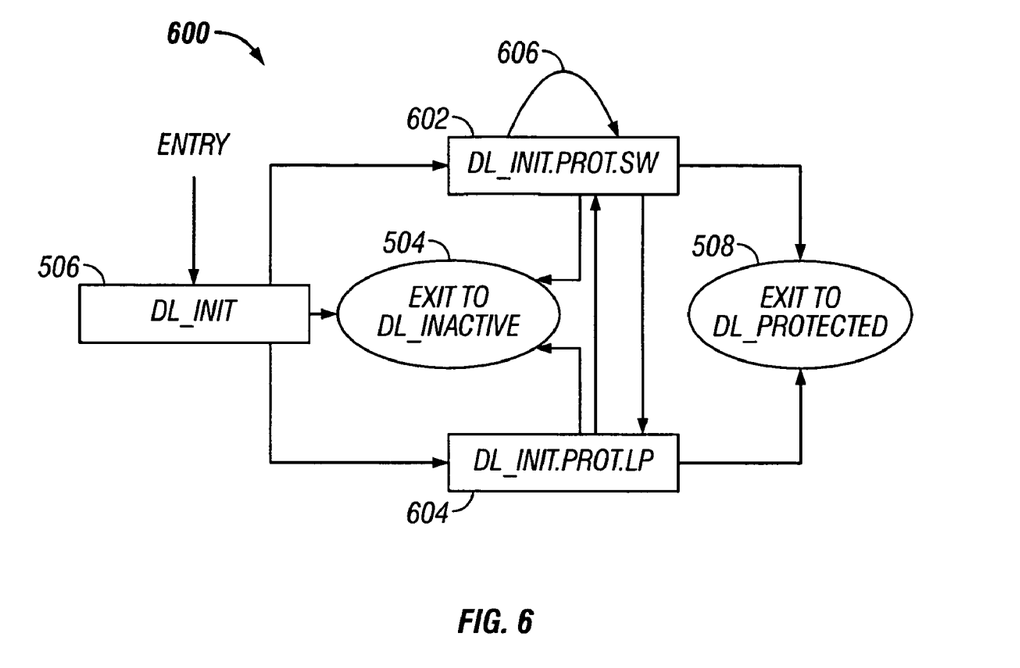
FIG. 6 is a state machine diagram for a transition from the DL_Init link state to the DL_Protected link state.
Figure 7:
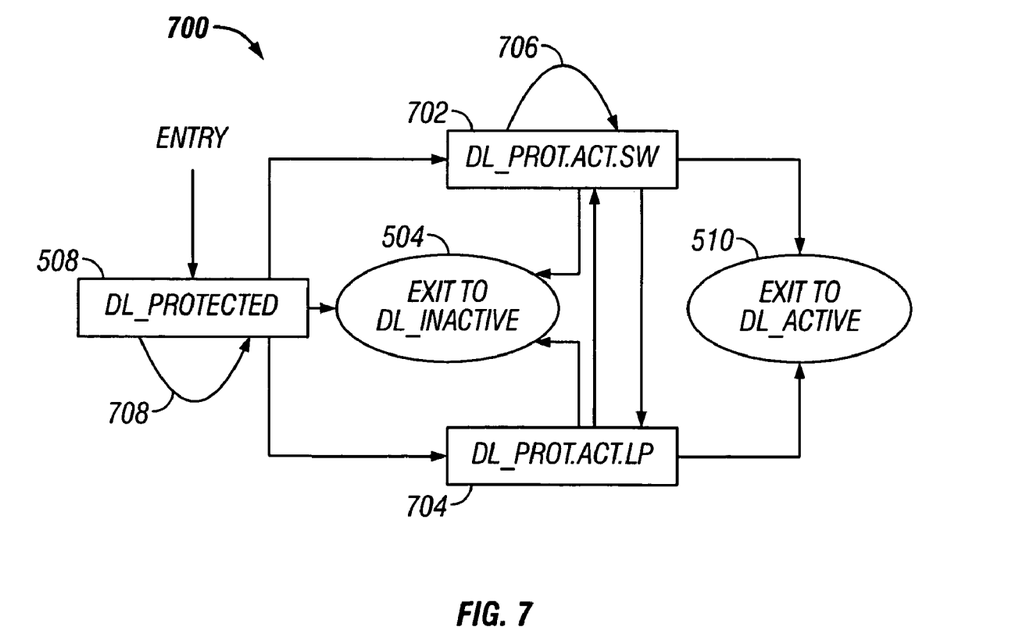
FIG. 7 is a state machine diagram for a transition from the DL_Protected link state to the DL_Active link state.
Figure 8:
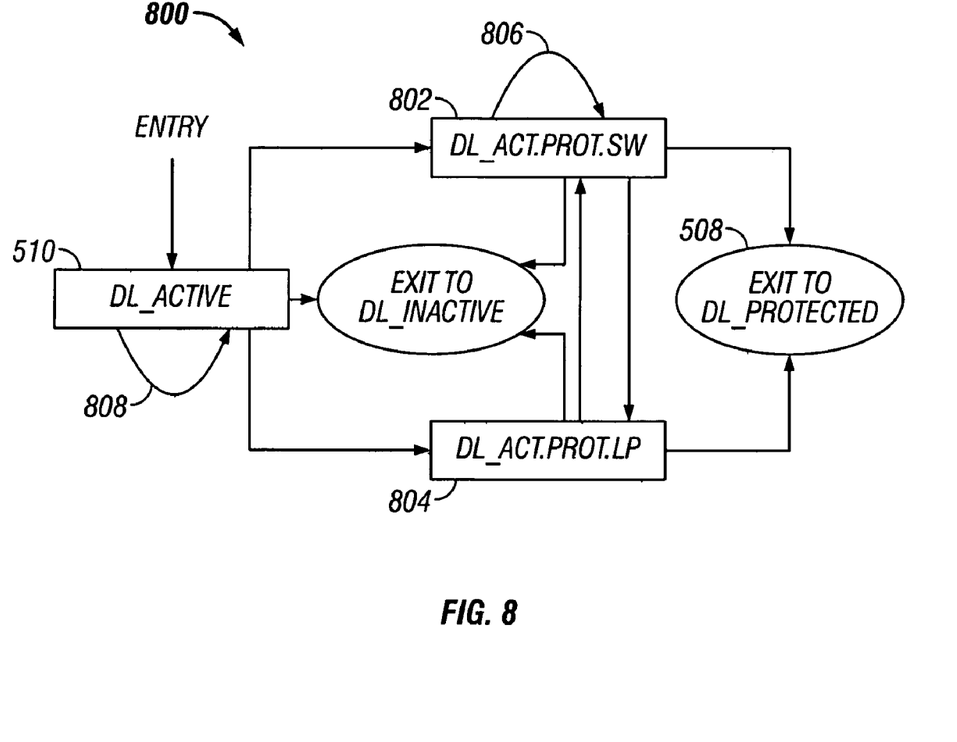
FIG. 8 is a state machine diagram for a transition from the DL_Active link state to the DL_Protected link state.

In an embodiment, transition sub-states may be added to the AS receive link state machine. The requirements for transition into the DL_Protected 508 and DL_Active 510 link states may be separated out of the DL_Init 506, DL_Protected 508, and DL_Active 510 link states into "smaller" transition sub-states, as shown in FIGS. 6-8. The transition sub-states are smaller in the sense that each transition sub-state has less functionality, and less requirements for transition, than the original state as defined in the AS Specification. This may make the link state machine easier to manage and may facilitate debugging efforts, allowing for a better determination of what has already been received by the local AS device as well as what needs to happen in order to transition to the desired state.

The AS link state machine may transition to a transition sub-state based upon what the local AS device has received or sent, e.g., software commands, state change DLLPs, and acknowledgement DLLPS. The state machine may transition to the desired link state whenever all of the requirements for transition laid out in the AS Specification (and errata) for the link state transition (now performed in link transition sub-states) have been fulfilled.

Table 3 identifies and describes the new link transition sub-states, which are also shown in FIGS. 6-8.

TABLE 3

| | |
|---|---|
| DL_Init.Prot.SW | Software directed transition from DL_Init to DL_Protected |
| DL_Init.Prot.LP | Link Partner requested transition from DL_Init to DL_Protected |
| DL_Prot.Act.SW | Software directed transition from DL_Protected to DL_Active |
| DL_Prot.Act.LP | Link partner requested transition from DL_Protected to DL_Active |
| DL_Act.Prot.SW | Software directed transition from DL_Active to DL_Protected |
| DL_Act.Prot.LP | Link partner requested transition from DL_Active to DL_Protected |

FIG. 6 is a state machine diagram for a transition from DL_Init 506 to DL_Protected 508. A device may begin a transition from DL_Init to DL_Protected in response to VC Discovery being completed and a state change request from a link partner.

When VC Discovery is finished, a device in DL_Init 506 will attempt to transition into the DL_Protected 508 state, the device transitions into the DL_Init.Prot.SW 602 transition sub-state. In this state, the device will send a link state DLLP requesting a transition to DL_Protected to its link partner. The device may remain in DL_Init.Prot.SW until it receives an acknowledgement from the link partner and a link state DLLP requesting transition into DL_Protected. When the device receives the corresponding link state transition request from the link partner, the device will transition to the DL_Init.Prot.LP 604 transition sub-state. In this state, the device will send an acknowledgement to the link partner and then transition to DL_Protected, all requirements for transition from DL_Init to DL_Protected laid out in the AS Specification having been met.

In an alternative embodiment, the device may transition from DL_Init.Prot.SW 602 to the DL_Init.Prot.LP 604 transition sub-state immediately after receiving the acknowledgment to its link state DLLP transition request being received and wait for the corresponding link state DLLP transition request from the link partner in DL_Init.Prot.LP. The device may then transmit an acknowledgement to the link partner and transition to DL_Protected 508.

If a link state DLLP requesting transition to DL_Protected is received in the DL_Init.Prot.SW transition sub-state, e.g., because the link partner finished the VC Discovery process which causes a transition to DL_Protected in the same time period as the local device, a flag may be set and the device may transition directly to DL_Protected, but only after an acknowledgement link state DLLP is received from the link partner as well. The acknowledgement to the link state DLLP transition request may be sent to the link partner from the DL_Protected state.

When a device in DL_Init receives a link state DLLP from its link partner requesting transition to DL_Protected prior to VC Discovery being completed, the device may transition directly to the DL_Init.Prot.LP 604 transition sub-state. The device may then transmit an acknowledgement to the link partner from the DL_Init.Prot.LP sub-state when VC Discovery has completed. In an embodiment, the device cannot transition to DL_Protected 508 until VC Discovery is completed. Upon completion of VC Discovery, an acknowledgement link state DLLP will be sent to the link partner, and the device will transition from DL_Init.Prot.LP 604 to the DL_Init.Prot.SW transition sub-state 602. In this sub-state, the device will transmit a link state DLLP requesting the link partner to transition to DL_Protected. The device will remain in DL_Init.Prot.SW until it receives an acknowledgement to its request from the link partner, at which point it will transition to DL_Protected, all requirements for transition from DL_Init to DL_Protected laid out in the AS Specification having been met.

The device may exit from DL_Init 506, DL_Init.Prot.SW 602, or DL_Init.Prot.LP 604 to DL_Inactive 504 when the link is taken down, either by software or hardware. For example, in the DL_Init.Prot.SW transition sub-state, the device may send out eight notifications 606 and if no acknowledgements have been received 10 microseconds after the transmission of the eighth notification, the device may transition to the DL_Inactive state 504.

FIG. 7 is a state machine diagram 700 for a transition from DL_Protected 508 to DL_Active 510. The transition events and flow correspond to those shown in FIG. 6. For software directed transitions, the device transitions directly to the DL_Prot.Act.SW 702 transition sub-state. For link partner requested transitions, the device transitions directly to the DL_Prot.Act.LP 704 transition sub-state.

In DL_Prot.Act.SW 702, the device may send out eight notifications 706 and if no acknowledgements have been received 10 microseconds after the transmission of the eighth notification, the device may transition to the DL_Inactive state 504. The device will remain in the DL_Protected link state 508 when link state DLLPs requesting transition to DL_Protected are received 708.

FIG. 8 is a state machine diagram 800 for a transition from DL_Active 510 to DL_Protected 508. The transition events and flow correspond to those shown in FIGS. 6 and 7. For software directed transitions, the device transitions directly to the DL_Act.Prot.SW 802 transition sub-state. For link partner requested transitions, the device transitions directly to the DL_Act.Prot.LP 804 transition sub-state.

In DL_Act.Prot.SW 802, the device may send out eight notifications 806 and if no acknowledgements have been received 10 microseconds after the transmission of the eighth notification, the device may transition to the DL_Inactive state 504. The device will remain in the DL_Active link state 510 when link state DLLPs requesting transition to DL_Active are received 808.

A number of embodiments have been described. Nevertheless, it will be understood that various modifications may be made without departing from the spirit and scope of the invention. Accordingly, other embodiments are within the scope of the following claims.

The invention claimed is:

1. A computer-implemented method comprising:
   a processor to accomplish the steps of:
   transitioning from a first link state that is an active state to a first transition sub-state in response to receiving a command to transition to a second link state that is a protected link state;
   transitioning from the first transition sub-state to a second transition sub-state in response to receiving a request for transition to the second link state from a link partner;
   sending an acknowledgement to the link partner; and
   transitioning to the second link state.

2. The method of claim 1, wherein receiving the command comprises receiving a software control command.

3. The method of claim 1, further comprising:
   sending the acknowledgement from the second transition sub-state.

4. The method of claim 1, wherein said receiving the request from the link partner comprises receiving the request in the first transition sub-state; and
   wherein said sending the acknowledgment comprises sending the acknowledgement in the second link state.

5. The method of claim 1, wherein the protected link state comprises an intermediate link state between the initialization link state and an active link state.

6. An apparatus comprising:
   a link state machine to control transition of the apparatus between a plurality of link states, the link state machine including:
   a first transition sub-state to be entered into in response to receiving a command to transition to a second link state; and
   a second transition sub-state to be entered into in response to receiving a request for transition to the second link state from a link partner;
   wherein the first link state comprises an active link state, and
   wherein the second link state comprises a protected link state.

7. The apparatus of claim 6, wherein the apparatus comprises an Advanced Switching (AS) device.

8. The apparatus of claim 6, wherein the command to transition to a second link state comprises a command from software.

9. The apparatus of claim 6, wherein the apparatus is operative to send an acknowledgement to the request from the link partner from the second transition sub-state.

10. The apparatus of claim 6, wherein the apparatus is operative to send a link state transition request to the link partner in the first transition sub-state.

11. The apparatus of claim 6, wherein the apparatus is operative to transition to the second link state from one of the first transition sub-state and the second transition sub-state.

12. The apparatus of claim 6, wherein the protected link state comprises an intermediate link state between the initialization link state and an active link state.

13. An article comprising a machine-readable medium including machine-executable instructions, the instructions to cause the machine to:
    transition from a first link state to a first transition sub-state in response to receiving a command to transition to a second link state;
    transition from the first transition sub-state to a second transition sub-state in response to receiving a request for transition to the second link state from a link partner;
    send an acknowledgement to the link partner; and
    transition to the second link state;
    wherein the instructions to cause the machine to transition from the first link state comprise instructions to transition from an active link state, and
    wherein the instructions to cause the machine to transition to the second link state comprise instructions to transition to a protected link state.

14. The article of claim 13, wherein the instructions to cause the machine to transition from the first and second link states comprise instructions to transition from first and second Advanced Switching (AS) link states.

15. The article of claim 13, wherein the instructions to cause the machine to receive the command comprise instructions to receive a software control command.

16. The article of claim 13, further comprising instructions to cause the machine to:
    send the acknowledgement from the second transition sub-state.

17. The article of claim 13, wherein the instructions to cause the machine to receive the request from the link partner comprise instructions to receive the request in the first transition sub-state; and
    wherein the instructions to cause the machine to send the acknowledgment comprise instructions to send the acknowledgement in the second link state.

18. The article of claim 13, wherein the protected link state comprises an intermediate link state between the initialization link state and an active link state.

* * * * *